Aug. 3, 1965     R. W. KICE ETAL     3,198,584
BLENDER FITTING
Filed Oct. 31, 1962     3 Sheets-Sheet 1
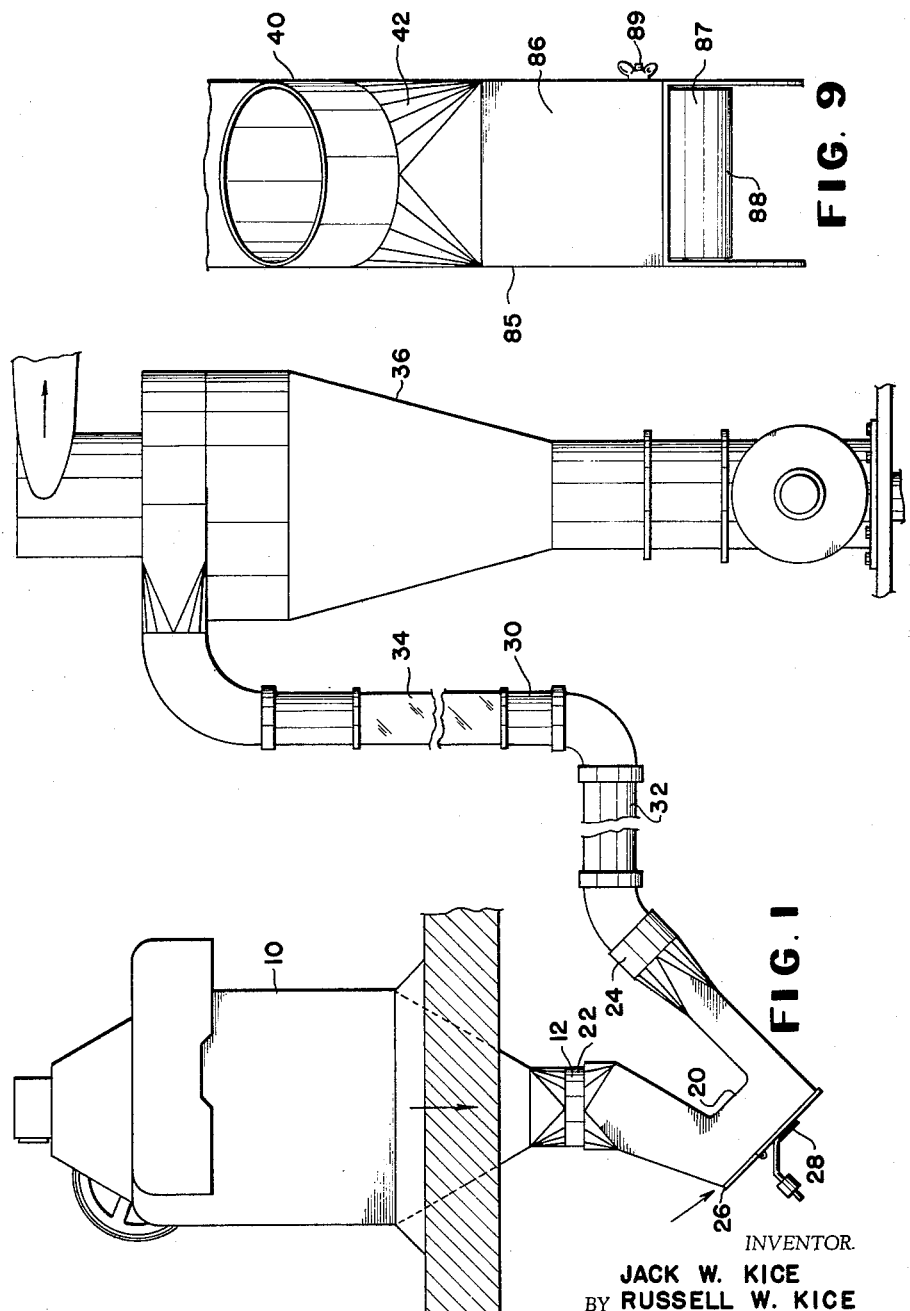
INVENTOR.
JACK W. KICE
BY RUSSELL W. KICE
John H. Widdowson
ATTORNEY Aug. 3, 1965 R. W. KICE ETAL 3,198,584
BLENDER FITTING
Filed Oct. 31, 1962 3 Sheets-Sheet 2
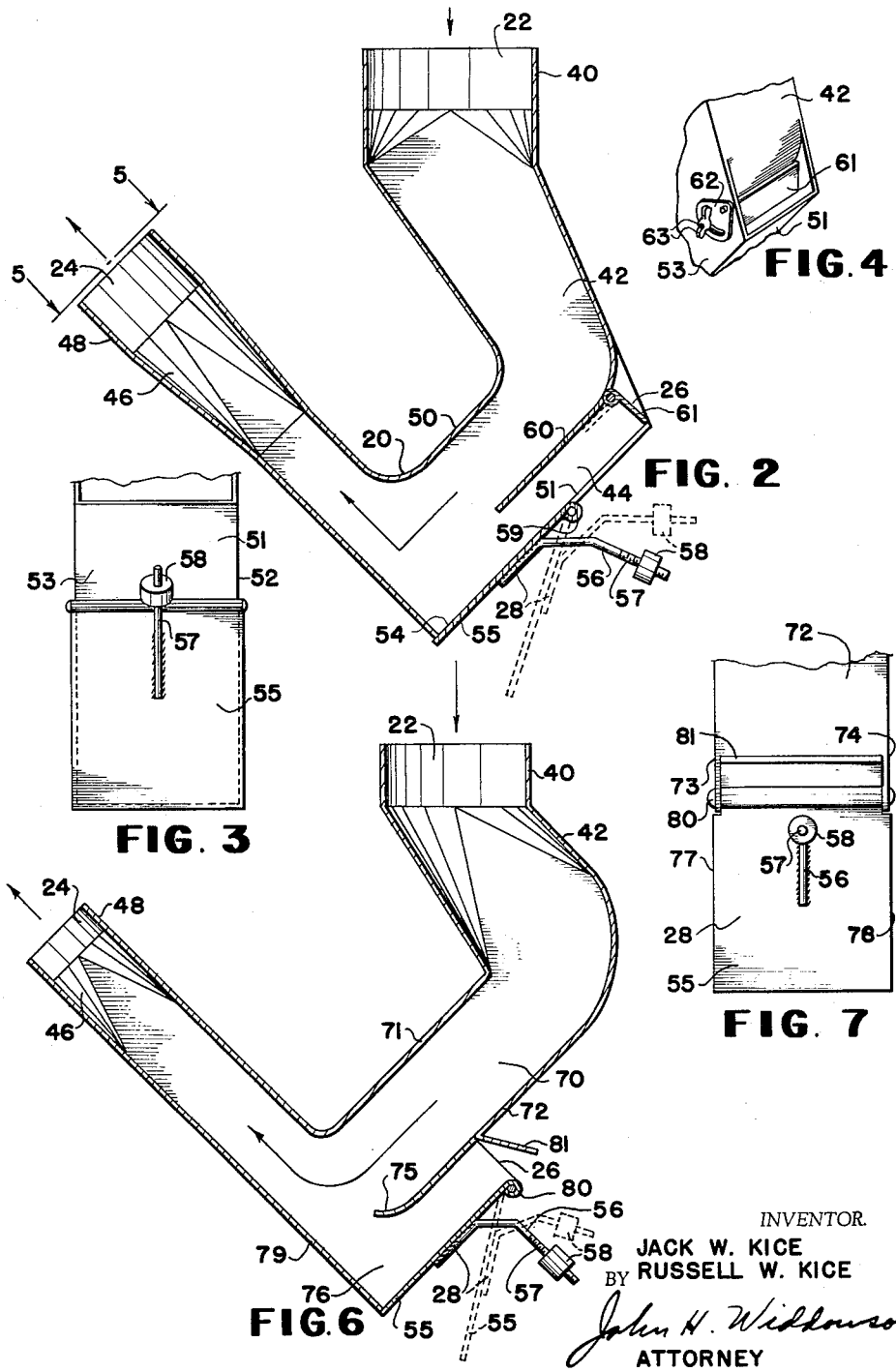
INVENTOR.
JACK W. KICE
BY RUSSELL W. KICE
John H. Widdowson
ATTORNEY

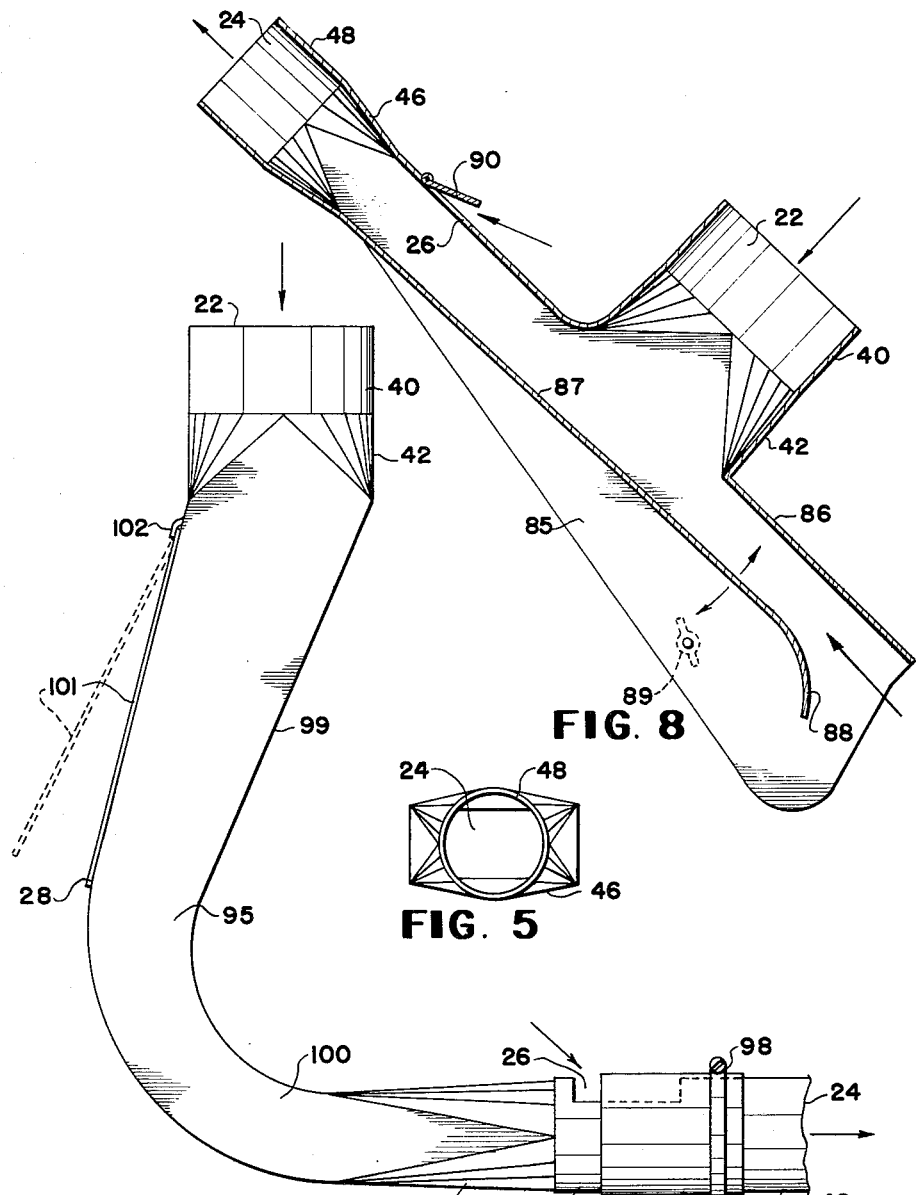

United States Patent Office 3,198,584
Patented Aug. 3, 1965

3,198,584
BLENDER FITTING
Russell W. Kice and Jack W. Kice, both of 2040 S. Mead, Wichita, Kans.
Filed Oct. 31, 1962, Ser. No. 234,500
5 Claims. (Cl. 302—51)

This invention relates to pneumatic conveying. In a more specific aspect this invention relates to pneumatic suction conveying systems for handling mill stock and the like. In another aspect, this invention relates to conduit fittings for pneumatic conveying systems, more specifically conduit fittings for blending air with the mill stock being conveyed to increase the efficiency of the system. Still more specifically this invention relates to conduit fittings for pneumatic conveying systems which are provided with air inlet means and overload release means to release material collected within this system. In yet another aspect, this invention relates to conduit fittings for pneumatic conveying systems that are choke-proof in operation. Yet another aspect of this invention is to provide conduit fittings for conveying systems that automatically release collected mill stock and the like from the pneumatic systems.

Pneumatic conveying systems for conveying mill stock and the like materials are well known in the art. These known pneumatic conveyors generally have a suitable source of material, which can be a grinding apparatus, a sifting apparatus, a storage bin or the like, which feeds material to be conveyed into a suitable conduit or tube. The material is transported through the tube by the flow of air induced in the tube or conduit. The pneumatic system may include an apparatus to separate the material from the air which is usually located in the general vicinity of the desired destination of the material. A suction means or exhaust means such as a blower or the like is operatively connected to the conduit means or separation apparatus to produce a vacuum therein which results in a flow of air in the system from the source of material toward the suction means. The material is thus conveyed in a stream of air to the separator means where the material being conveyed is separated and moved into the desired storage means or other apparatus and the cleared air drawn off out of the exhaust means.

One major problem in such pneumatic conveyors involves the stoppage or clogging of the conduits or tubes with the material being conveyed. Clogging of the conduits or tubes can be caused by many factors. For example, a stoppage may be caused by feeding the material into the system at a rate greater than the conveying capacity rate of the system. The conveying capacity of the conveyor can vary depending upon the moisture content of the material being conveyed, the atmospheric pressure, the humidity, the particle size of the material being conveyed, and many other factors. Thus, it is not always possible to accurately estimate the capacity of the system. Further clogging occurs when there is a momentary drop in air pressure within the system which might be caused by a momentary low voltage or power failure of the exhaust system or possibly manipulation of various valves and the like in the system which allow air to leave or enter same thus lowering the air stream velocity in the conduit. When a pneumatic conveying system becomes choked with material, a great deal of time, work and energy involving a great deal of expense are required to clear the conduits in order to return the system to normal operation.

Fittings for pneumatic conveying systems that blend air with the material are known in the art. Also, fittings which employ a material release means to release collected material in the system are known. However, the fittings of the prior art utilize one or both of the above-mentioned means have not proven to be satisfactory in use. Many of the prior art conduit fittings are cumbersome, expensive and inefficient, often utilizing blowers and the like which require an additional source of power. Many of the conduit fittings known to the prior do not combine an air inlet means with a material release means, and therefore cannot obtain the desirable interaction and correlation of the two respective functions. In the conduit fittings of the prior art that do utilize an air inlet and a material release means, there is no satisfactory correlation between the functions of each. The conduit fittings as such are not automatic and must be reset after each material release operation. Further the automatic material release means in the known conduit fittings are not arranged to cooperate with the air inlet means to enable a pneumatic conveying system that is clogged to automatically clear the stoppage and resume normal operation without assistance and attention from an operator. In general, the known conduit fittings at least only prevent complete clogging of the remaining portion of the system. Further, the pneumatic conveying systems of the prior art are in general not designed to assure that a stoppage, if it does occur, will be restricted to a single point location in the system. In the pneumatic systems and the conduit fittings of the prior art the air inlet means and the conduits have not been designed to enable the system to efficiently convey material in horizontally disposed conduits. The known blender conduits and pneumatic systems that include an air inlet means are not constructed to assure that the velocity of the air within the system is correspondingly higher in the conduit portions not equipped with a material release means to correct or prevent clogging.

The new pneumatic conveying system and blender conduits of our invention have proven free of all the problems associated with the conveying systems of the prior art. We have with a simple inexpensive, easy to manufacture conduit fitting solved all the problems associated with prior art pneumatic conveying systems.

The new pneumatic conveyor for handling mill stock and the like material of our invention includes a source of mill stock or the like material. It has a first generally upwardly extending conduit means having upper and lower ends. It has a conduit fitting means. The conduit fitting means has an inlet means, an outlet means, an intermediate conduit portion having an outlet opening for material collected therein, and an adjustable air inlet means in said intermediate conduit portion, and an automatic self-correcting overload means. The pneumatic system also includes a second conduit means having inlet and outlet ends, which is usually substantially vertical but can conveniently contain a horizontal run of considerable length, a separator means, and an air exhaust means. The first conduit means is operatively attached at its upper end to the source of mill stock and operatively connected at its lower end to the inlet means of said conduit means. The second conduit means is operatively connected at its inlet end to the outlet means of said conduit fitting means and said outlet end communicating with said separating means. The exhaust means is operatively attached to the separator means to draw the air therethrough and through said first and second conduit means and said blender fitting.

The new conduit fitting of our invention has an inlet means and an outlet means. It has an intermediate conduit portion having an outlet opening for solid material collected therein. On said intermediate conduit portion there is provided an adjustable air inlet means, and an automatic self-correcting overload means for controlling the outlet for collected solid material. Preferably the transverse cross sectional area of the outlet opening is less than the transverse cross sectional area of the intermediate portion of the fitting to further assure that the velocity of the air stream will be greater near and beyond said outlet opening.

The new pneumatic conveying system and conduit fitting means of our invention overcomes all of the problems associated with pneumatic conveying systems and blender conduit fittings of the prior art. Our conduit fitting means when installed in a pneumatic conveying system is effective, trouble-free in operation, simple to install, inexpensive to produce, automatic in operation, and makes possible the conveying of mill stock and the like material in both horizontal and vertical conduits and combinations thereof. Further our conduit fitting means reduces the power requirement for pneumatic conveying by introducing air that increases the velocity of the air stream and material in the system at a critical point. The air need not be drawn through the entire system but rather is admitted at an intermediate point thus reducing friction drag of the air stream. The conduit fitting means of our invention includes both an inlet air means and an overload release means. They are arranged and correlated to obtain the fullest advantage of their cooperative functions. The air inlet means is arranged to increase and effectively propel the material being conveyed in a portion of the system downstream from the overload material release means. This arrangement virtually eliminates the possibility of a stoppage downstream from the overload release means which is relatively unprotected by the release means. Further, it provides a means for maintaining the downstream portion of the conduit unobstructed and assists in localizing any potential stoppage in the area of the overload release means. The overload release means in our conduit fittings are designed to allow the material causing the stoppage in the conduit to be released therefrom. After the material is automatically released, the system is again rendered operative. Thus the conduit fitting is constructed and adapted to utilize the individual functions of the air inlet means and the automatic overload release means and obtain the advantages resulting from their cooperative association.

It is an object of this invention to provide a new conduit fitting for pneumatic conveying systems.

It is another object of this invention to provide a new pneumatic suction conveying system.

Yet another object of this invention is to provide a new blender fitting for a pneumatic conveying system that adapts the system to convey material over relatively long lengths of horizontally disposed conduits.

Still another object of this invention is to provide a new conduit means that localizes the area of possible stoppages in a pneumatic conveying system and is adapted to control and correct said stoppages.

Yet another object of this invention is to provide a new blender fitting for a pneumatic conveying system that is constructed to provide a greater air stream velocity in the outlet area than in the major portion of said blender fitting.

Still another object of this invention is to provide a new blender fitting for a pneumatic conveying system that is constructed and adapted to utilize the cooperative advantages of an air inlet means and an overload release means incorporated therein.

It is another object of this invention to provide a new pneumatic suction conveying system having an inlet air means and a new automatic overload release means incorporated therein.

Yet another object of this invention is to provide a new pneumatic suction conveying system that localizes the potential stoppage area in same and is adapted to control and correct said stoppages.

Still another object of this invention is to provide a pneumatic conveying system that is adapted to convey mill stock and the like material over relatively long lengths of horizontal conduits.

Other objects and advantages of the new blender fitting and pneumatic conveying system of my invention will become apparent to those skilled in the art upon reading this disclosure.

Drawings accompany and are a part of this disclosure. These drawings depict preferred specific embodiments of the new blender fitting and pneumatic conveying system of our invention and it is to be understood that such drawings are not to unduly limit the scope of our invention.

In the drawings,

FIG. 1 is a front elevational view of a preferred specific embodiment of our new pneumatic suction conveyor system of our invention.

FIG. 2 is a front elevational view in cross section of a preferred specific embodiment of the conduit blender fitting of our invention.

FIG. 3 is a fragmentary view of FIG. 2 showing the automatic overload release means as seen from the lower right-hand side of FIG. 2.

FIG. 4 is a fragmentary perspective view showing the flap adjustment means utilized in the structure shown on FIG. 2.

FIG. 5 is a view taken on line 5 of FIG. 2.

FIG. 6 is a front elevational view in cross section showing another preferred specific embodiment of the new blender fitting of our invention.

FIG. 7 is a fragmentary view illustrating the automatic overload release means structure of FIG. 6 as it would appear when viewed from the lower right-hand side of FIG. 6.

FIG. 8 is a front elevational view in cross section of still another modification of the blender fitting of our invention.

FIG. 9 is a side elevational view of the blender fitting shown in FIG. 8.

FIG. 10 is a front elevational view of yet another modification of the blender fitting of our invention.

The following is a discussion and description of a preferred specific embodiment of the new pneumatic conveying system and preferred specific embodiments of blender fittings of our invention made with reference to the drawings wherein the same reference numerals are used to indicate the same or similar parts and/or structure. The discussion and description is of preferred specific embodiments of the new conveying system and blender fitting structure of our invention, and it is to be understood that such is not to unduly limit the scope of our invention.

Referring now to the drawings, FIGS. 1–10 and FIG. 1 in particular wherein is shown the pneumatic conveying system of our invention. The pneumatic conveying system has a source of material 10 which can be a grinder apparatus, mixing apparatus, sifting apparatus, storage bin or the like. A first generally upwardly extending conduit means 12 having upper and lower ends is connected at its upper end to source of material 10. The conduit 12 can be of any suitable length and diameter. A blender conduit fitting means 20 having an inlet means 22 operatively is attached to conduit 12. An outlet means 24 for the blender fitting is provided in a position downwardly removed from said source of millstock. The blender conduit fitting means 20 is provided with an adjustable air inlet means 26, and an automatic self-correcting overload means 28. A second conduit means 30 having inlet and outlet ends is operatively connected to said outlet means 24 of said blender conduit 20. The conduit means 30 can be of any suitable length and shape and can include horizontal conduit portions 32 of any suitable length. A glass viewing portion 34 in conduit 30 can be provided if desired. A separator means 36 is operatively attached to the outlet end of conduit 30. The separator means 36 is generally of the cyclone type whose function is to separate the material being conveyed in the pneumatic system from the conveying or propelling air. Basically the cyclone separating means swirls the air with the entrained material causing the heavier element, namely the stock material to settle out. The material is then removed from the separating means. An air exhaust means (not shown) is operatively connected to the separator means to produce a suction or sub-atmospheric pressure in the pneumatic system. This suction causes outside air to rush into the normally substantially closed system through the opening in or near the source of material, and carries the mill stock introduced by the source of material along to its desired destination. The blender fittings hereinafter described can be substituted for blender fitting 20.

In FIGS. 2–5 is shown a preferred specific embodiment of our blender conduit fitting. Our blender conduit fitting 20 has an upwardly facing annular inlet collar 40. A downwardly inclined hollow inlet leg portion 42 of progressively decreasing cross sectional area is integrally joined to said inlet collar 40. The longitudinal axis of the inlet leg portion 42 intersects the longitudinal axis of the inlet collar 40 and forms an obtuse angle therewith. A downwardly inclined hollow chamber portion 44, having a generally rectangular cross section, is integrally joined to the inlet leg portion 42 with the longitudinal axis of said chamber portion 44 intersecting the longitudinal axis of said inlet leg portion and forming an angle slightly greater than a right angle therewith. An upwardly inclined hollow outlet leg portion 46 is integrally joined to the chamber portion 44 with the longitudinal axis of the outlet leg portion intersecting the longitudinal axis of said chamber portion 44 and forming approximately a right angle therewith. An annular outlet collar 48 is integrally joined to said outlet leg portion. All of the longitudinal axes of said inlet collar 40, inlet leg portion 42, chamber portion 44, outlet leg portion 46 and outlet collar 48 are in the same plane. The outlet leg portion 46 has a progressively decreasing transverse cross sectional area with the transverse cross sectional area being the least at the end adjacent the outlet collar. The outlet leg portion 46 has a rectangular transverse cross section at its lower end and a circular transverse cross section at its upper end. The chamber portion 44 has relatively flat upper side 50, lower side 51 and opposed sides 52 and 53 respectviely. It also has an opening 54 in the lower side 51 positioned in the lower end thereof. A balanced automatic self-resetting overload release means 28 is provided on the lower side 51 of the chamber portion 44 and is comprised of a flat panel 55 and an adjustable balance means 56. The balance means 56 is comprised of a threaded rod 57 affixed to panel 55 and extending outwardly therefrom. Weight means 58 threadedly engages said rod and provides a delicate balance adjustment for said overload release means 28. A hinge means 59, positioned on the uppermost end of panel 55, is provided to support same. Within chamber 44 is provided a baffle means 60 which is disposed parallel to and spaced from said upper side 50 and lower side 51 and extends at least one-half the longitudinal length of said chamber portion 44. The baffle means 60 is joined to opposite sides 52 and 53 and at its upper end to inlet leg portion 42 forming a smoothly rounded junction therewith. There is provided an adjustable air inlet means 26 on chamber portion 44. It is comprised of a hinged rigid flap 61 mounted on the uppermost end of chamber portion 44 between said baffle means 60 and said lower side 51. An adjustable securing means for said inlet means 26 is provided, as shown more clearly in FIG. 4. It consists of a slotted locking plate 62 mounted to rotate with flap 61, and a bolt means 63 complete with a screw means rigidly mounted on side wall 53 of chamber 44.

In use, in a pneumatic suction conveying system, the material to be conveyed enters inlet means 22, and is carried downwardly by gravity and a downwardly moving stream of air produced by the aforementioned exhaust means. The material continues to fall and is deflected by baffle 60. In normal operation the material and the conveying stream of air flow smoothly through chamber portion 44, outlet leg 46, and out of outlet collar 48. As is evident in FIG. 5, transverse cross sectional area of outlet leg 46 progressively decreases. As the cross sectional area decreases the point velocity of the conveying air stream increases, since substantially the same volume of air must pass through all portions of the conduit. As the conduit necks down the air stream velocity increases as the air nears the neck portion. As the air velocity increases the carrying capacity of the air stream increases. Therefore, there is less likelihood of a stoppage occurring the farther along the material progresses in the outlet leg. Preferably the conduit joined to the outlet collar has substantially the same cross sectional area. The velocity of the air stream thus remains high.

Any clogging or stoppage that may occur is most likely to occur in the lower end of chamber portion 44. In the event that a stoppage or clogging occurs in chamber 44, there will be a reduction in the vacuum within the conduit means. Thus, the pressure within the conduit means will approach that outside the system allowing the overload release means 28 to open. Opening of automatic release means 28, namely the swinging back of panel 55, allows any material clogging the conduit means to drop out thus clearing the system for continued normal operation. The balance means 56 is arranged to position the door so that upon release of the collected material the vacuum pressure within the conduit will be sufficient to close the panel 55. Preferably panel 55 will open to the position indicated in the dotted lines when the exhaust means is inoperative, that is, when there is no vacuum in the system.

The adjustable balance 58 can be adjusted to change the center of gravity of the inlet air means 28, namely the panel 55 to compensate for variations in pressures encountered in various pneumatic systems and other variables. As a further aid to increase the efficiency of the conduit fitting there is provided an inlet air means 26. The inlet means allows additional air to be admitted into the blender fitting which combines with the air already flowing in the conduit to further increase the velocity of the air stream. The air stream velocity is increased by blending in additional air because the volume of air is increased that flows through a conduit of the same cross sectional area. The inlet air admitted with said inlet air means travels downwardly beneath baffle 60 and upon merging with the air stream in the system turns the flow of materials around the corner formed between chamber portion 44 and outlet leg portion 46. The inlet air stream from inlet air means 26 will aid in picking up small accumulations of collected material in the lower portion of chamber 44 and blending same with the conveying air stream. Thus, the overload release means 28, the inlet air means 26, and the reduction of the cross sectional area in outlet leg 46 all combine to effect an efficient trouble-free dependable blender conduit fitting and a similarly dependable automatic conveying system by combining and interacting the separate individual functions of each. It is also contemplated that a progressive reduction in the cross sectional area of the conduit joined to the outlet collar could produce the same effect as progressively reducing the cross sectional area of the outlet leg. This would increase the velocity of the air stream for the same reasons stated above to produce substantially the same results.

In FIGS. 6 and 7 is shown another modified preferred specific embodiment of our blender conduit fitting. The conduit blender fitting depicted in FIG. 6 has an upwardly facing annular inlet collar 40. A downwardly inclined hollow inlet leg 42 is integrally joined to said inlet collar 40. The inlet leg portion 42 has a circular cross section on the end adjacent the inlet collar 40 and a rectangular cross section on the opposite end. The longitudinal axis of the inlet leg portion 42 intersects the longitudinal axis of the inlet collar 40 and forms an obtuse angle therewith. Joined to said inlet leg portion 42 is a downwardly inclined hollow central portion 70 having a generally rectangular cross section and joined to inlet leg portion with a smoothly curved juncture. The longitudinal axis of the central portion 70 intersects the longitudinal axis of inlet leg portion 42 forming an angle slightly greater than a right angle therewith. An upwardly inclined hollow outlet leg portion 46 is integrally joined to said central portion 70, said outlet leg portion having a transverse rectangular cross section on the end adjacent the central portion and a circular cross section on the opposite end. The transverse cross sectional area of the outlet leg portion progressively decreases along at least a portion of its length with the cross sectional area preferably being the least at the end opposite the central portion. The longitudinal axis of the outlet leg portion 46 intersects the longitudinal axis of the central portion 70 and forms approximately a right angle therewith. An annular outlet collar 48 is integrally joined to said outlet leg portion. Preferably, the cross sectional area of the outlet collar 48 is substantially less than the cross sectional area of the inlet collar 40. All the axes of the inlet collar, inlet leg portion, central portion, outlet leg portion, and outlet collar are preferably in the same plane. However, the axes need not be in a single plane, and the angles between the respective axes can be varied. The central portion 70 is provided with relatively flat upper 71, lower 72, and opposed parallel sides, 73 and 74 respectively. The lower side 72 terminates in a curved end portion 75 a distance approximately the width of an outlet leg portion from the corresponding side of the outlet leg portion and forms an opening therebetween. A chamber means 76 communicates with and covers said opening. This chamber means 76 consists of parallel spaced relatively flat side walls, 77 and 78 respectively, joined to side walls 73 and 74 of the central portion 70, and an end wall 79. On chamber 76 is mounted a balanced automatic self-resetting overload release means 28 consisting of a flat panel 55 extending between side walls 77 and 78, a hinge means 80 supporting said panel 55, a balance adjustment means 56 consisting a threaded rod 57 affixed to the flat panel 55 and extending outwardly therefrom, and a weight means 58 threadedly mounted on rod 57. On the upper end of chamber 76, opposite end 79, is provided an adjustable air inlet means 26 consisting of a rigid flap 81, and an associated adjustable flap positioning means. The blender fitting is adapted in use in a pneumatic suction conveying system to add with an adjustable air inlet means a predetermined amount of air at a strategic point to increase the air velocity in the system and propel the material being conveyed on a moving stream of air. The structure of the blender fitting is also adapted to prevent clogging of the entire pneumatic conveying system by automatically allowing collected material to leave the system with my automatic self-resetting overload release means.

The blender fitting embodiment shown in FIGS. 6 and 7 operates in generally the same manner as the embodiment disclosed in FIGS. 2 through 5. The air and material entering inlet means 22 enters at a relatively slow rate since the cross sectional area of said inlet means is relatively great. The material and air stream proceed downwardly and then is drawn upwardly through outlet leg 46. The curved portion 75 aids in turning the stream of material and air. Further additional air enters through air inlet means 26, passes downwardly through chamber 76 and upwardly into outlet 46 aiding in streamlining the flow of air and material. The air entering through air inlet 26 also increases the velocity of the air stream in the same manner and for the same reasons as the air entering in the aforementioned embodiment. As the air and material proceed upwardly through outlet leg portion 46 the stream velocity also increases since the transverse cross sectional area of the outlet leg portion progressing decreases. Therefore, any stoppage in the blender fitting is most likely to occur at the junction of the central portion 70 and the outlet leg portion 46, since the material and air stream is traveling relatively slow, and is no longer aided by gravity. In the event of a stoppage, the stoppage is automatically cleared from the penumatic suction conveying system when overload release means 28 opens for the same reasons as explained in the aforementioned embodiment.

Still another preferred specific embodiment of our blender fitting is shown in FIGS. 8 and 9. This blender fitting for use in a pneumatic suction conveying system for handling mill stock and the like material has an upwardly facing annular inlet collar 40. Integrally joined to said inlet collar 40 is a coaxially extending hollow inlet leg portion 42, this inlet leg portion having a circular cross section on the end adjacent the inlet collar 40 and a rectangular transverse cross section on the opposite end. A hollow central portion 85 is joined to the lower end of the inlet leg portion 42. A hollow outlet leg portion 46 is integrally joined to said central portion 85. This outlet leg portion 46 has a rectangular transverse cross section on the end adjacent said central portion 85 and a circular transverse cross section on the opposite end. The transverse cross sectional area of the inlet leg portion is approximately constant throughout its length, and greater than the average transverse cross sectional area of the outlet leg portion 46. There is provided a coaxially extending annular outlet collar 48 which is integrally joined to the outlet leg portion 46. Preferably the cross sectional area of the outlet collar is substantially less than the transverse cross sectional area of the inlet collar. The blender fitting is constructed so that the common longitudinal axis of the inlet collar 40 and the inlet leg portion 42 intersects and forms substantially a right angle with the common longitudinal axis of the outlet leg portion 46 and outlet collar 48. The central portion 85 has a first elongated section 86 that is U-shaped in transverse cross section. Between the legs of this U-shaped section 86 is disposed a relatively flat thin member 87 having one of its ends, namely the upper end, attached to the upper end of the central portion 85 adjacent the outlet leg portion 46, and an outwardly curved portion 88 on the opposite lower end. In order to secure the flat member 87 in a desired operative position, we have provided a bolt and wing-nut means 89 which extends through the ends of the legs of the U-shaped section and is adapted to force same against the member 87 in frictional engagement. Tightening the wing nut therefore forces the relatively flexible legs of the U-shaped member 86 against the sides of flat member 87 securing it in the desired position and adjusting the opening formed between the member 87 and a U-shaped section 86. As is evident in the drawings, the inlet leg portion 42 is joined to the central portion 85 in substantially its center in the base of the U-shaped section 86. An adjustable air inlet means 26 is provided and consists of an opening in the base of the U-shaped section 86 disposed between the inlet leg portion 42 and the outlet leg portion 46. A hingedly mounted adjustable rigid flat member 90 is disposed over the opening. The blender fitting is adapted in use in a pneumatic suction conveying system to add with the adjustable air inlet means 26 a predetermined amount of air at a point near the outlet to increase the air velocity in the system and thus provide a choke proof operation and also increase the efficiency of the conveying action. The inlet means 26 has the effect of increasing the air stream velocity at all points downstream from the central portion thus reducing the possibility of a stoppage in that portion of the system. This localizes the position of a potential stoppage in a vicinity near an outlet opening which can automatically eliminate it. The outlet leg portion and/or conduit can also be provided with a progressively reduced cross sectional area if desired. The blender fitting can also be used as a classifier to separate lighter materials from heavier materials and/or objects such as nuts, bolts, etc. which might otherwise damage grinding apparatus and the like. The blender fitting is also adapted to prevent clogging of the entire system by automatically allowing collected materials to leave the system through the opening formed between section 86 and flexible member 87.

In operation the blender fitting modification shown in FIGS. 8 and 9 receives material from inlet means 22. Air entering from the opening formed between section 86 and flat member 87 combines with the air in the system and aids in streamlining the flow and increasing the stream velocity of the air and material leaving outlet means 24. The air inlet means 26 disposed between the inlet leg 42 and outlet leg 46 further increases the air stream velocity for the same reasons as elaborated on in the previously described air inlet means in the fitting embodiments. The conveying air stream velocity is therefore greater in the area or vicinity of the outlet and therefore the possible danger in this area of a stoppage is least. Any stoppage which might occur is most likely to occur in the area formed by the junction of inlet leg 42 and chamber 85. If the stoppage occurs at this point, as is most likely, the collected material is free to slide down flat member 87 and leave the system thus clearing the system leaving it free to continue its normal operation. The air stream velocity could also be increased near the outlet of the blender fitting by providing a smaller connecting conduit or pipe. The outlet leg portion can be constructed to provide a progressively decreasing cross sectional area if desired but need not be since the air inlet in the illustrated location is capable of increasing the stream velocity.

Still another preferred embodiment of my blender fitting is shown in FIG. 10. This blender fitting is also adapted for use in a pneumatic suction conveying system for handling mill stock and the like material and has an upwardly facing annular inlet collar 40. Integrally joined to this inlet collar 40 is a coaxially extending hollow inlet leg portion 42. The inlet leg portion 42 has a circular cross section on the end adjacent the inlet collar 40 and a rectangular transverse cross section on the opposite end. A central portion 95 is joined to the lower end of inlet leg portion 42. A hollow outlet leg portion 46 is joined to the opposite end of central portion 95. The outlet leg portion 46 has a rectangular cross section on the end adjacent the central portion 95 and a transverse circular cross section on the opposite end. A coaxially extending annular outlet collar 48 is integrally joined to the outlet leg portion. On the outlet leg portion 46 is provided an adjustable air inlet means 26 consisting of a cylindrical shaped section 96 having an opening therein. A slidable sleeve 97 encircles cylindrical section 96 in overlying or partially overlying relationship to the aforementioned opening. A suitable securing means 98 is provided to secure the sleeve in any desired relative position on the cylindrical portion 96. The central portion 95 consists of a first inclined tapered section 99 having preferably a progressively decreasing cross sectional area, and a rectangular opening. A second curved section 100 is joined to the first section 99. In section 99 there is provided an automatic self-resetting overload release means 28 consisting of a flat thin rectangular hinged panel 101 overlying the aforementioned opening and secured in place by hinge means 102 on the top of panel 101. The panel 101 is arranged so that gravitational force will tend to close the panel over the opening. As shown in FIG. 10 the panel 101 in closed position is inclined slightly from the horizontal. The blender fitting is adapted in use on a pneumatic suction conveying system to add an adjustable predetermined amount of air at a point near the outlet to thus increase the air stream velocity at this point and beyond in the conduit system thus reducing the likelihood of a stoppage occurring in the area adjacent the outlet and beyond. The outlet leg can be constructed to provide a progressively decreasing transverse cross sectional area if desired to further increase the stream velocity, but need not be, the location of the air inlet means enables said air inlet to adequately perform this vital function. The automatic overload release means 28 is adapted to prevent clogging of the system by automatically allowing collected material to leave the system through said opening. This preferred specific embodiment of our blender fitting has been constructed so that the automatic material release means is positioned in the blender conduit at the point where a stoppage is most likely to occur. This point is located by the location of the air inlet means and the construction of the fitting. The blender fitting utilizes the cooperative functions of the various enumerated elements to produce a fitting means capable of assuring a choke-proof operation of a pneumatic system embodying same in the conduit system. The velocity of the conveying air stream could instead be increased adjacent the outlet of the blender conduit by providing a conduit of a smaller transverse cross sectional area connected to the blender outlet.

The blender fitting of our invention can be made of any suitable material. Preferably they are formed of flat metal sheets shaped and secured to each other by welding, riveting, joint locks, etc. to form the finished blender fitting. The blender fitting can be adapted to be connected to both circular, rectangular or square conduits by merely reshaping the inlet and outlet collars. They can be made in any suitable size depending on the size and capacity of a pneumatic suction conveying system which they are to be installed.

As will be obvious to those skilled in the art, various changes and modifications of the pneumatic suction conveying system and blender fittings of our invention disclosed herein can be made or followed without departing from the scope of the disclosure or from the scope of the claims.

We claim:
1. A blender fitting for use in a pneumatic suction conveyor system for handling mill stock and the like material comprising, an upwardly facing annular inlet collar, a downwardly inclined hollow inlet leg portion of progressivey decreasing transverse cross sectional area integrally joined to said inlet collar, the longitudinal axis of said inlet leg portion intersecting the longitudinal axis of said inlet collar and forming an obtuse angle therewith, a downwardly inclined hollow chamber portion having a generally rectangular cross section integrally joined to said inlet leg portion, the longitudinal axis of said chamber portion intersecting the longitudinal axis of said inlet leg portion and forming an angle slightly greater than a right angle therewith, an upwardly inclined hollow outlet leg portion integrally joined to said chamber portion, the longitudinal axis of said outlet leg portion intersecting the longitudinal axis of said chamber portion and forming approximately a right angle therewith, an annular outlet collar integrally joined to said outlet leg portion, all of longitudinal axes of said inlet collar, inlet leg portion, chamber portion, outlet leg portion, said outlet collar being in the same plane, the outlet leg constructed to provide a progressively decreasing transverse cross sectional area with the cross sectional area being the least at the end adjacent the outlet collar, said chamber portion having relatively flat upper lower and opposed sides, an opening in said lower side positioned in the lower end thereof, a balanced automatic self-resetting overload release means on the lower side of said chamber portion, said overload release means comprising a flat panel covering said opening and extending at least one-half the length of said lower side, hinge means operatively attached on the uppermost end of said flat panel, a balance adjustment means for said overload release means, said balance adjustment means comprising a threaded rod affixed to said flat panel and extending outwardly therefrom, and a weight means threadedly engaged on said rod, a baffle means within said chamber portion disposed parallel to and spaced from said upper and lower sides and extending at least one half the longitudinal length of said chamber portion, said baffle means joined to said opposed sides and said inlet leg portion and forming a smoothly rounded junction therewith, an adjustable air inlet means on said chamber portion comprising, a hinged rigid flap mounted on the uppermost end of said chamber portion between said baffle means and said lower side, a slotted locking plate mounted to rotate with said flap, and a thumb screw and bolt means rigidly mounted on said chamber portion positioned in said slot, said blender fitting constructed and adapted in use in a pneumatic section coveying system to add with said adjustable air inlet means a predetermined amount of air at a strategic point to thus increase the air stream velocity in the pneumatic conveyor system and propel the material on a rising or moving current of air and consequently increasing the efficiency of the conveying action, prevent clogging of the entire system by automatically allowing collected material to leave the system via an automatic self-resetting overload release means, and funneling the air and material being conveyed in said outlet leg portion to provide a choke proof action by increasing the velocity of said air and material as it proceeds along the outlet leg portion.

2. A conduit blender fitting for use in a pneumatic suction conveyor system comprising an inlet collar a downwardly inclined inlet leg portion of progressively decreasing cross sectional area joined to said inlet collar, a downwardly inclined chamber portion having upper and lower ends and upper, lower and opposed sides, said upper end joined to said inlet leg portion, an upwardly inclined outlet leg portion having a progressively decreasing transverse cross sectional area joined to said lower end of said chamber portion, an outlet collar joined to said outlet leg portion, said inlet collar, inlet leg portion, chamber portion, outlet leg portion and outlet collar forming a conduit fitting presenting a passage therethrough, a baffle means in said chamber portion disposed parallel to said upper and lower sides and spaced therefrom, said baffle means joined at its upper end to said inlet leg portion in a smoothly rounded juncture and extending only a portion of the length of said chamber portion, an automatic overload release means comprising an opening in the lower side of said chamber portion, a hinged panel means covering said opening, and a balance means on said panel means, an adjustable air inlet means disposed between said baffle means and said lower side wall of said chamber portion, said fitting adapted when incorporated into a pneumatic suction conveying system to add air to the system to increase the air stream velocity in the system and thereby increase the conveying and lifting capacity of same, and to prevent clogging by allowing excess material to leave the system via the automatic overload release means, and increasing the velocity of the conveying air stream and material beyond said overload release means.

3. A conduit blender fitting for use in a pneumatic suction conveyor system comprising, an inlet means, a downwardly inclined inlet leg portion joined to said inlet means, a downwardly inclined chamber portion having upper and lower ends and a flat inclined bottom side, said upper end joined to said inlet leg portion, and an upwardly inclined outlet leg portion of progressively decreasing transverse cross sectional area joined to said lower end of said chamber portion, an outlet means joined to said outlet leg portion, said inlet means, inlet leg portion, chamber portion, outlet leg portion, and outlet means forming a conduit fitting presenting an unobstructed passage therethrough, a baffle means in said chamber portion extending from said upper end to a point midway the length of said chamber portion, an automatic overload release means on said chamber portion comprising an opening in said inclined bottom side adjacent the lower end of said chamber portion, a panel means covering said opening, a hinge means on the top of said panel means, a balance means on said panel means, an adjustable air inlet means disposed in the upper end of said chamber means, said conduit blender fitting adapted when incorporated into a pneumatic suction conveying system to add air to the system and thereby increase the conveying and lifting capacity of same, and to prevent clogging by allowing excess material to leave the system via the automatic overload release means, and increasing the velocity of the air stream in the outlet leg portion.

4. A pneumatic conveying system for handling mill stock and the like material comprising, a source of mill stock or the like material to be handled, a first generally upwardly extending conduit means having an upper and a lower end, a conduit blender fitting comprising, an inlet collar, a downwardly inclined inlet leg portion of progressively decreasing cross sectional area joined to said inlet collar, a downwardly inclined chamber portion having upper and lower ends, and inclined upper and lower sides, said upper end of said chamber portion joined to said inlet leg portion, an outlet leg portion joined to said lower end of said chamber portion, an outlet collar joined to said outlet leg portion, said inlet collar, inlet leg portion, chamber portion, outlet leg portion and outet collar forming a conduit fitting presenting an unobstructed passage therethrough, a baffle means in said chamber portion disposed parallel to said upper and lower sides and spaced therefrom, said baffle means joined at its upper end of said inlet leg portion in a smoothly rounded juncture and extending only a portion of the length of said chamber portion, an automatic overload release means comprising an opening in said lower inclined side of said chamber portion, a panel means covering said opening, hinge means on the top of said panel means, and a balance means on said panel means, an adjustable air inlet means disposed between said baffle means and said lower wall side of said chamber portion, a second generally upwardly extending conduit having inlet and outlet ends, a separating means, and an air exhaust means, said first conduit means operatively attached at its upper end to said source of mill stock and operatively connected at its lower end to said inlet collar of said conduit blender fitting, said second conduit means operatively connected at its inlet end to said outlet collar of said conduit blender fitting and said outlet end communicating with said separator means, and said air exhaust means operatively attached to said separator means to draw air therethrough and through said first and second conduit means and said blender fitting.

5. A conduit blender fitting for use in a pneumatic conveyor system comprising, an inlet collar, an inlet leg portion of progressively decreasing cross sectional area joined to said inlet collar, an inclined chamber portion having upper and lower ends, and upper, lower and opposed sides, said upper end joined to said inlet leg portion, an upwardly extending outlet leg portion having a progressively decreasing transverse cross sectional area joined to said lower end of said chamber portion, an outlet collar joined to said outlet leg portion, said inlet collar, inlet leg portion, chamber portion, outlet leg portion and outet collar forming a conduit fitting presenting a passage therethrough, a baffle means in said chamber portion disposed parallel to said upper and lower sides and spaced therefrom, said baffle means joined at its upper end to said inlet leg portion and extending only a portion of the length of said chamber portion, an automatic overload release means comprising, an opening in the lower side of said chamber portion, a hinge panel means covering said opening, and a balance means on said panel means, an adjustable air inlet means in said chamber portion adjacent said baffle means, sid fitting adapted when incorporated in a pneumatic conveying system to add air to the system to increase the air stream velocity in the system and thereby increase the conveying and lifting capacity of same, and to prevent clogging by allowing excess material to leave the system by the automatic overload release means, and increasing the velocity of the conveying air stream and material beyond said overload release means.

References Cited by the Examiner

UNITED STATES PATENTS

| 2,639,862 | 5/53 | Watts | 302—17 |
| 2,649,339 | 8/53 | Schaetzel | 302—17 |
| 2,689,688 | 9/54 | Ball | 302—32 |

FOREIGN PATENTS

| 1,027,592 | 4/58 | Germany. |
| 479,542 | 3/53 | Italy. |

SAMUEL F. COLEMAN, *Primary Examiner.*

ANDRES H. NIELSEN, *Examiner.*